United States Patent
Shimizu et al.

(10) Patent No.: US 6,772,343 B1
(45) Date of Patent: Aug. 3, 2004

(54) DATA PROCESSOR, COMMUNICATION SYSTEM AND RECORDING MEDIUM

(75) Inventors: Hideo Shimizu, Kawasaki (JP); Fumihiko Sano, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/379,797

(22) Filed: Aug. 24, 1999

(30) Foreign Application Priority Data

Aug. 24, 1998 (JP) .......................................... 10-237206

(51) Int. Cl.⁷ ............................................... H04L 9/00
(52) U.S. Cl. ........................... 713/193; 380/43; 380/37
(58) Field of Search ................................. 713/193, 169; 380/28, 37, 42, 43

(56) References Cited

U.S. PATENT DOCUMENTS 3,962,539 A   6/1976 Ehrsam et al. ................. 178/22
4,074,066 A * 2/1978 Ehrsam et al. ............... 713/181

OTHER PUBLICATIONS

Federal Information Processing Standards Publication 81; National Institute of Standards and Technology (NIST) ; Dec. 2, 1980.

English–language translation of Office Action dated Mar. 30, 2004, from the Japanese Patent Office in Japanese Application No. 237206/98.

* cited by examiner

Primary Examiner—Matthew Smithers
(74) Attorney, Agent, or Firm—Finnegan, Henderson, Farabow, Garrett & Dunner, L.L.P.

(57) ABSTRACT

There is provided a data processor in which a plain text or a cipher text is segmented into two or more small blocks, the small blocks are each data-processed one small block as a unit to transform to a new small blocks and then the new small blocks are encrypted or decrypted. The data processor comprises transformation means F for transforming small blocks with keys, mutual action means for causing a mutual action to a pair of a small block which has been transformed by the transformation means and another small block, chaining means for chaining small blocks. With the data processor, even when a block length in encryption is short, high transmission efficiency can be enjoyed and Feistel type cryptosystem can be realized while preventing reduction in a degree of security due to shortness of a block length.

14 Claims, 8 Drawing Sheets

DATA PROCESSOR, COMMUNICATION SYSTEM AND RECORDING MEDIUM

BACKGROUND OF THE INVENTION

This invention relates to a data processor, a communication system and a recording medium and particularly, to a data processor, a communication system and a recording medium suitable for encryption and decryption of data.

Data encryption using a computer has widely been adopted in recent years.

Encryption algorithms for this purpose are in a broad sense segmented into a block cipher in which data are segmented into a set of blocks each in a given length and encryption is conducted for each block as a unit, and a stream cipher in which the input data is encrypted one character by one character. There is a difference between a block cipher and a stream cipher: while the same input of a block cipher is transformed into the same output of the block cipher, in a case of a stream cipher, even the same input is transformed into a different output.

As a conventional block cipher, only a cryptosystem has been known in which a length of input/output is fixed and no cipher with a variable input/output length has been realized. In a conventional method, in order to encrypt a variable-length input, there is no way but to encrypt blocks one by one or to chain encrypted blocks.

As a cryptosystem in which a variable-length input is encrypted, a operation mode is famous. In this method, an input whose length does not coincides with a multiple of a block length is provided with padding wherein a block of the input with a length shorter than a given block length has padding with a proper bit size so that the input is divided into a plurality of blocks with the given block length. However, in this method, since encryption has to be performed after adjustment of a block length, a problem arises due to reduction in transmission efficiency.

On the other hand, since a block cipher has a nature that the same input gives the same output, there arises a fault that a block length cannot be short. The reason is that when a block length is short, an input table corresponding to an output thereof can be formed. If such a table has been formed, information can be taken out from a cipher text by decrypting the cipher text into an original plain text without knowledge of a key.

A stream cipher can be regarded as a random number generator, since a random number sequence output by the same initial value (key) is different and an initial value is hard to be traceable from the random number sequence. While this point is a base of the security of a steam cipher, if the same key is continued to be used, random number sequences themselves are finally known to an attacker and thereby a cipher has a risk to be decrypted even without knowledge of a key. A block cipher with an increased length of a block can be considered a solution to avoid such a problem inherent to a stream cipher.

Herein, a case where a comparatively short communication message is encrypted will be discussed. If a communication message is long, reduction in transmission efficiency caused by padding in a block cipher is not problematic. However, a comparatively short message has a chance in which reduction in transmission efficiency is seriously problematic.

For example, in a charging system in which payment is due for each received program as in the case of a satellite broadcast, the charging system is realized by a individual information, which is transmitted only to a contracted user, and which is prepared by encrypting a key obtained through encrypting a program itself with a user key. Since individual information is constituted of blocks each with a comparatively short length and the number of individual information units is large, reduction in transmission caused by padding is a great problem. If high transmission efficiency is desired, it is necessary for a block length to be short so as to make padding smaller, which arises another problem to reduce a degree of security.

Of the above-described problems, a problem relating to transmission efficiency is solved by using a stream cipher, but if a stream cipher is used, there is a necessity for a key to be frequently changed in order to increase a degree of security, which pushes a cost upward tremendously.

On the other hand, Nyberg et al. has proposed a method for constructing a secure substitution table for a block cipher which is required for designing a secure DES cryptosystem, that is, a Feistel type cipher. That is, Nyberg et al. has shown that if a substitution table is prepared so as to have a nature called APN (Almost Perfect Non-liner), a cipher which has a provable security against a typical cipher attacking method, such as a differential cryptanalysis or a linear cryptanalysis can be created.

Therefore, it has been desired means in which a block cryptosystem in which a message is transformed not to a steam cipher, but to a Feistel type cipher for which a design policy proposed by Nyberg et al. is applicable is employed and the messages are encrypted with high efficiency, even when many comparatively short communication messages, which is described above, are encrypted.

BRIEF SUMMARY OF THE INVENTION

The present invention has been made in consideration of such circumstances and accordingly, it is a first object of the present invention to provide a data processor, a communication system and a recording medium by which even when a block length of a block cipher is short, not only is reduction in security due to shortness of a block length prevented from occurring, but transmission efficiency is also increased and a Feistel type cipher is prepared.

Further, it is a second object of the present invention to provide a data processor, a communication system and a recording medium in which a block length itself can be variable.

The present invention has been made in order to achieve such an object.

According to a first aspect of the present invention, therein a provided a data processor comprising:
- a transformation section in which small blocks which are obtained by sequentially segmenting at least one of a plain text and a cipher text from a leading edge thereof are transformed with keys;
- a mutual action section in which the small blocks transformed in the transformation section and another small blocks mutually act on each other; and
- a chaining section in which the small blocks transformed in the transformation section are chained with another small blocks not adjacent to the small blocks transformed in the transformation section.

Since the present invention is provided with such means, a mutual action between small blocks is made possible and further chaining is also performed between small blocks of each pair in a proper manner, a degree of robustness of a cryptosystem can be increased.

Besides, since the same effect as in a case where a length of a small block is actually longer can be obtained by the chaining, a degree of robustness against cryptosystem can be prevented from being reduced even if a length of a small block is short.

According to a second aspect of the present invention, there is provided a data processor of the first aspect,     wherein, of the small blocks obtained by segmenting at least one of the plain text and the cipher text, odd-numbered small blocks counted from a leading edge of the small blocks obtained by segmenting at least one of the plain text and the cipher text and small blocks following the odd-number small blocks are named as odd-numbered small column blocks, even-numbered small blocks counted from the leading edge of the small blocks obtained by segmenting at least one of the plain text and the cipher text and small blocks following the even-number small blocks are named as even-numbered small column blocks, and     the mutual action section causes the odd-numbered small column blocks to mutually act with the even-numbered column blocks and the chaining section causes the odd-numbered small column blocks to mutually act with each other and causes the even-numbered small column blocks to mutually act with each other.

Since such means are provided in the present invention, a cryptosystem in which a mutual action occurs between small blocks respectively of an odd-numbered column and an even-numbered column can be realized. Therefore, for example, a Feistel type cipher can be attained between odd- and even-numbered columns. Further, since a chaining action is performed between odd- and even-numbered columns, the above-described mutual action between a pair of odd- and even-numbered columns are scaled up to be an overall mutual action between the whole group of odd-numbered columns and the whole group of even-numbered columns.

Further, a degree of robustness of a cryptosystem can be retained by a chaining action even if a length of a small block is shorter. Therefore, even if a plain text before segmentation into small blocks is short, efficient encryption can be realized with small blocks short in length.

Even if a block length is short in block encryption in such a manner, not only reduction in security due to shortness of a block length is prevented from occurring, but a transmission efficiency can also be increased and a Feistel type encryption is further made possible.

Besides, when the number of chaining of small blocks is changed, a length of a block composed of plural small blocks (referred to as a segmented block in embodiments) can be variable.

Further, according to a third aspect of the present invention, there is provided a data processor of the second aspect,     wherein a chaining direction in the chaining section is a forward direction of columns; and     each of odd-numbered columns and even-numbered columns has the transformation section at a single row or more.

Therefore, a degree of robustness of cryptosystem and a processing time period can be adjusted by changing the number of rows.

Further, according to a fourth aspect of the present invention, there is provided a data processor of the third aspect,     wherein the number of rows at which transformation sections are located, the transformation sections being included in the odd-numbered column and the even-numbered column, is decreased with increase in the number of the odd-numbered columns and the even-numbered columns.

Formations of a chaining between small blocks are sequentially conducted from the leading position of an encryption/decryption object. For example, a result of first transformation means is input to a second closest column from the first transformation means to perform an exclusive OR with a small block in the second closest column. This processing is sequentially repeated on every two column.

In a case where such chaining processing is sequentially performed, processing results of columns are sequentially output after processing in each column. Therefore, if the number of processing rows at which transformation means operate is decreased in a part where the number of columns is large, an overall processing speed can be increased. In the mean time, since an effect of randomized data bits or the like by a chaining is higher as the number of columns is large, the number of rows in the part is decreased with a little adverse influence on robustness of a cipher.

Further, according to a fifth aspect of the present invention of the present invention, there is provided a data processor of the third aspect,     wherein the chaining direction of the chaining section is switched from a forward direction of columns to a backward direction thereof when the number of rows at which the transformation sections are located reaches a prescribed number.

When such a chaining is realized, an effect of randomized data bits can be high not only in a part where the number of column is large, but in a part where the number of column is small, which contributes to further increase in robustness of a cryptosystem.

Further, according to a sixth aspect of the present invention there is provided a data processor of the third aspect,     wherein processing in the transformation sections other than transformation sections where a dependence relationship arises due to processing in the mutual action section and processing in the chaining section is performed in parallel.

With such means provided, the present invention can realized efficient processing.

Further, according to a seventh aspect of the present invention, there is provided a data processor of the second aspect,     wherein at least one of a length of the small blocks and the number of chaining of the small blocks is variable.

With such means provided, the present invention can freely change a length of a segmented block composed of a plurality of small blocks while a robustness of a cryptosystem is retained.

Further, according to an eighth aspect of the present invention, there is provided a communication system comprising:

a first communication system for transmitting a cipher by using the data processor of the second aspect; and     a second communication system for decrypting the cipher transmitted from the first communication system to a plain text by using the data processor of the second aspect,     wherein a block length of the which is determined by a length of the small block and the number of chaining of small blocks is shared between the first and second communication systems.

With such means provided, the present invention can enjoy not only effects of the data processors according to any of the second to sixth aspects of the present invention but a cryptosystem with a higher degree of difficulty in deciphering can be obtained through keeping a block length in secret.

Further, according to a ninth aspect of the present invention, there is provided a communication system of the eighth aspect, wherein the block length is variable in each of the small blocks.

Further, according to a tenth aspect of the present invention, there is provided a communication system of the ninth aspect, further comprising:

a random number generator for determining the block length based on a seed which is shared by the first and second communication systems.

Since the present invention is provided with such means, a block length is harder to be found by a third party, which enables a robustness of a cryptosystem to be further reinforced.

Further, according to an eleventh aspect of the present invention, there is provided a communication system of the eighth aspect, wherein a timing in which a direction of a chaining is switched is shared by the first and second communication systems.

Since the present invention is provided with such means, a way of chaining can be secret and thereby a robustness of a cryptosystem can be further strengthened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Descriptions will be given of embodiments of the present invention below:

First Embodiment of the Present Invention

Figure 1:
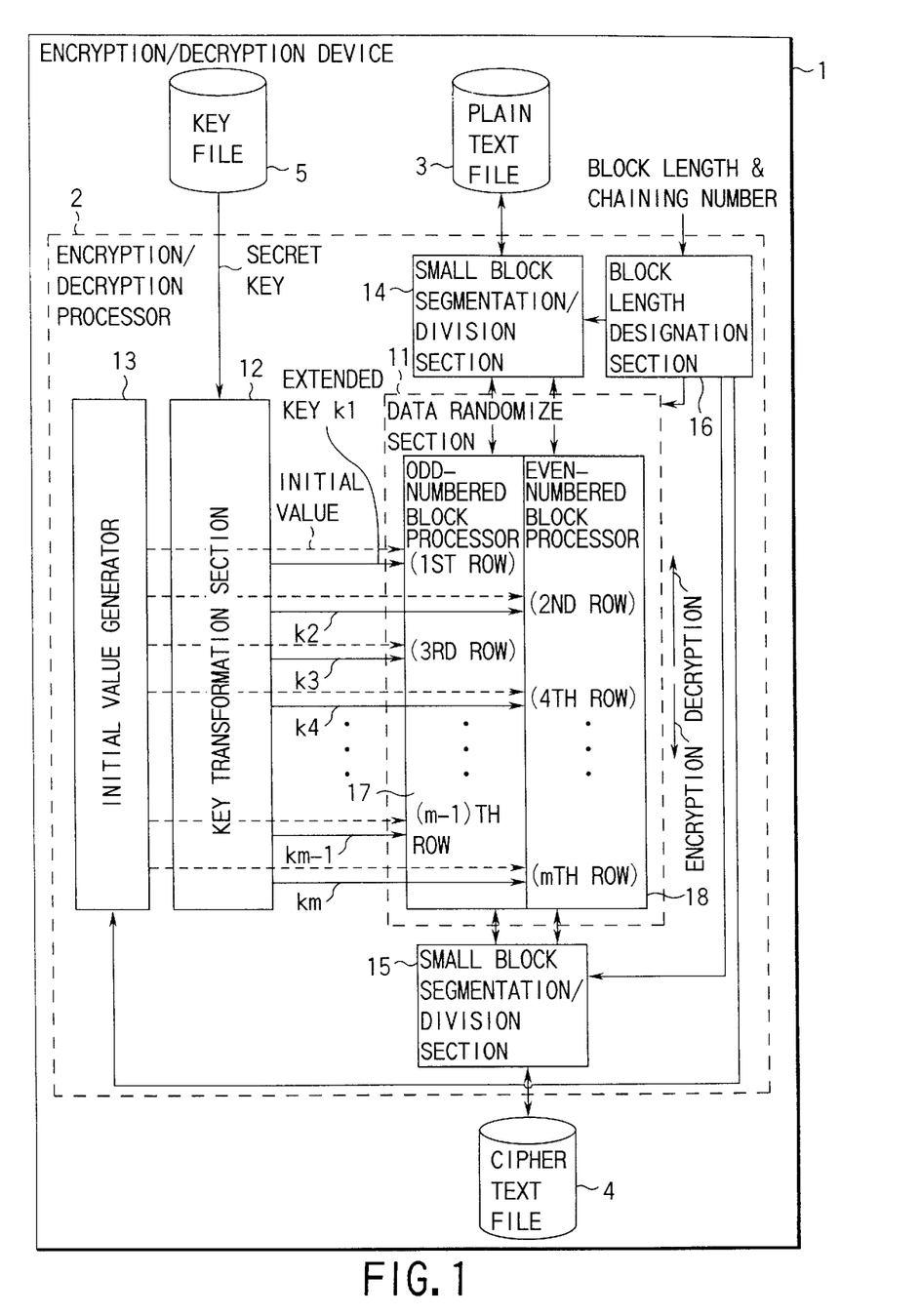
FIG. 1 is a block diagram showing an example of a configuration of a data processor according to a first embodiment of the present invention.

FIG. 1 is a block diagram showing an example of a configuration of a data processor according to a first embodiment of the present invention.

The data processor is constructed as an encryption/decryption section 1 of a computer such as a personal computer or a work station. The encryption/decryption section 1 comprises an encryption/decryption processor 2 which executes encryption and decryption and a storage means (not shown) for storing a plain text file 3, a cipher text file 4 and a key file 5.

Herein, data, which are not segmented to blocks, and which are to be encrypted, are stored in the plain text file 3. A secret key which is to be used in the encryption/decryption processor 2 is stored in the key file 5.

The encryption/decryption processor 2 comprises a data randomize section 11 in which encryption and decryption at the mth row are executed, a key transformation section 12 in which extended keys K1, K2, . . . Km (hereinafter also simply referred to as key) are generated from a secret key and given to the data randomize section 11, an initial value generator 13 for generating initial values corresponding to rows respectively, small block segmentation/division sections 14 and 15, and a block length designation section 16.

The block length designation section 16 determines a block length (for example, 1 byte) for encryption or decryption and the number of chaining, (described later), based on a prescribed setting value or a block length designation input provided externally and further, gives the block length to the small block segmentation/division sections 14 and 15, the data randomize section 11 and the initial value generator 13. Alternatively, a case is allowable in which a block length of a small block is fixed, only the number of chaining is calculated from a real length (i.e. division block length) of a encryption object which is a product of a block length and the number of chaining and thereafter the number of chaining thus obtained is input to the respective sections.

The small block segmentation/division section 14 segments a plain text retrieved from the plain file 3 into small blocks with a designated block length from the leading edge of the plain text and odd-numbered small blocks are input to an odd-numbered block processor 17 of the randomize section 11, while even-numbered small blocks are input to an even-numbered block processor 18. Decrypted data output from the randomize section 11 in each small block are edited and output as a plain text to the plain text file 3.

The small block segmentation/division section 15 conducts similar processing of the small block segmentation/division section 14 on the last row (mth row) side of the randomize section 11. That is, not only is a cipher text retrieved from the cipher text file 4 segmented to small blocks with a designated block length from the leading edge of the cipher text, but encrypted data output from the randomize section 11 is edited and then output to the cipher text file 3 as a cipher text.

The data randomize section 11 comprises: the odd-numbered block processor 17 and the even-numbered block processor 18, and small blocks each with a block length designated by the block length designation section 16 are encrypted and decrypted by the initial values and the extended keys K given from the key transformation section 12.

The odd-numbered block processor 17 is input with odd-numbered small blocks and performs processing of encryption and decryption at the 1st row, the 3rd row, the 5th row, . . . , the m−1th row, while the even-numbered processor 18 is input with even-numbered small blocks and performs processing of encryption and decryption at the 2rd row, the 4th row, the 6th row, . . . , the mth row. In the mean time, in the case of encryption, the processing is sequentially executed from the 1st row and data for which the processing at the mth row has been completed is output as encrypted data. In the case of decryption, the processing is sequentially executed from the mth row in the reversed order, contrary to the former case, and data for which the processing at the 1st row has been completed is output as decrypted data.

While the odd-numbered block processor 17 and the even-numbered block processor 18 are schematically shown in FIG. 1, the block processors 17 and 18 are constructed of many of processings in which small blocks as inputs are actually chained or treated in some other ways. While it is described later in detail, processing of a Feistel type is realized between the odd-numbered block processing and the even-numbered block processing, and processing between small blocks within each of the odd-numbered block processing and the even-numbered block processing is performed in a state of a chaining.

How processing goes in the data randomize section 11 will be described using FIGS. 2 to 6 in a concrete manner. What is simply expressed as keys in the figure may be an extended keys K generated from a single key as described above.

Figure 2:
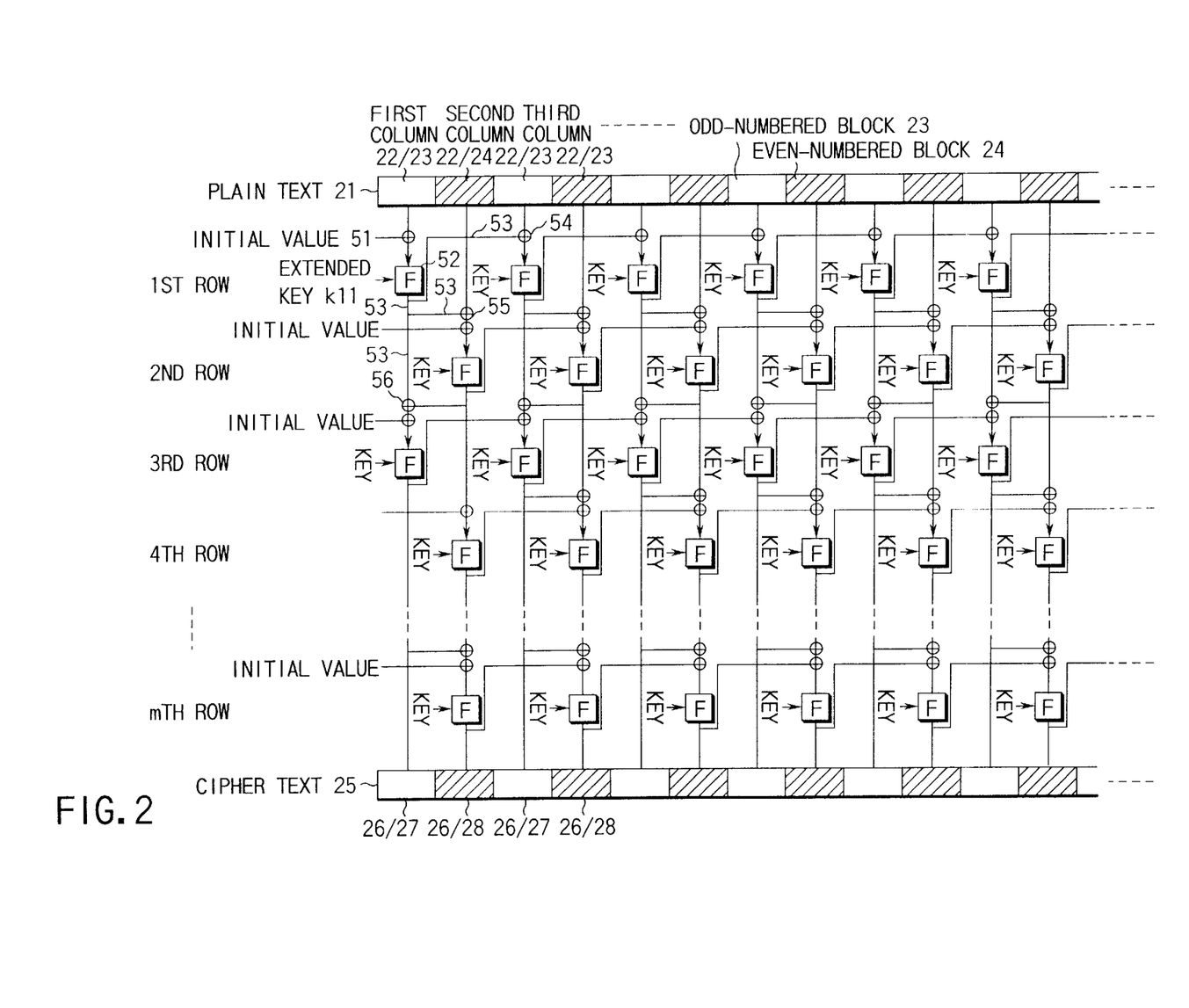
FIG. 2 is a block diagram showing a concrete example of a configuration of a data randomize section in the first embodiment.

FIG. 2 is a block diagram showing a concrete example of a configuration of a data randomize section in the first embodiment.

As shown in the figure, a plain text 21 which is an input is segmented to small blocks 22 and the small blocks 22 are input. The small blocks 22 are selectively input one by one starting from the leading block so as to separate the small blocks 22 into two groups of odd-numbered blocks 23 and even-numbered blocks 24, and thereby, the odd-numbered small blocks 23 and the even-numbered small blocks 24 are respectively subjected to the odd-numbered block processing and the even-numbered block processing. If processing columns corresponding to small blocks 22 of the plain text 21 are indicated by the 1st column, the 2rd column, . . . sequentially, processing of an odd-numbered column corresponds to odd-numbered block processing and processing of an even-numbered column corresponds to even-numbered block processing.

In the mean time, a cipher text 25 is also composed of small blocks 26 and the small blocks are selectively input one by one in decryption while separating to two groups of odd-numbered blocks 27 and even-numbered blocks 28.

Figure 3:
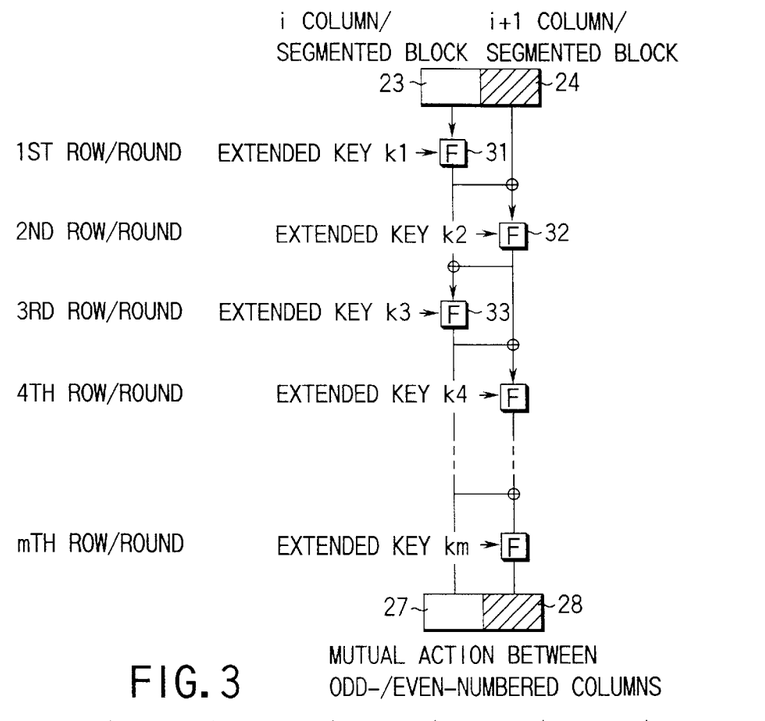
FIG. 3 is a diagram of a pair of odd-numbered and even-numbered columns adjacent to each other extracted from the configuration of FIG. 2.

FIG. 3 is a diagram of a pair of odd-numbered and even-numbered columns adjacent to each other extracted from the configuration of FIG. 2.

In processing of the extracted pair of odd-numbered and even-numbered columns, the ith block 23 in the ith column (i is an odd integer) is transformed by a function F31 at the 1st row, one duplicate of the transformation result is input to the i+1th column and an exclusive OR with the i+1th block 24 is conducted and the exclusive OR result is input to a function F32 at the 2rd row. In the function F32 at 2rd row, the input is transformed by an extended key K2, the transformation result is returned back to the ith column, an exclusive OR with the other duplicate of the transformation result from the function F31 at the 1st row is conducted and the exclusive OR result is input to a function F33 at the 3rd row.

Hereinafter, such mutual actions between the ith column and the i+1th column are repeated and progressed till the last row and the encrypted small blocks 27 and 28 are output.

An odd-numbered processing result is made to mutually act on an even-numbered processing result and thereby, a cipher which is harder to decipher and therefore is more secure can be generated. Herein, the processing between the ith column and the i+1th column is Feistel type encryption.

Figure 4A:
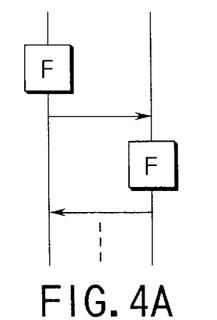
FIGS. 4A, 4B and 4C are diagrams schematically showing transformation examples in a Feistel type block cipher.
Figure 4B:
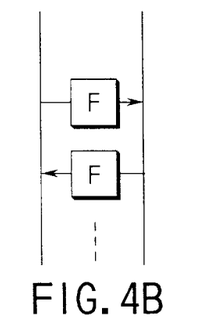
Figure 4C:
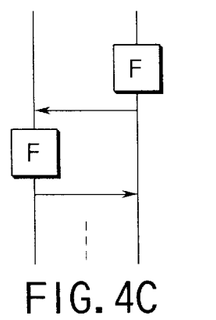

FIGS. 4A, 4B and 4C are diagrams schematically showing transformation examples in a Feistel type block cipher.

FIGS. 4A, 4B and 4C shows examples of flows of data chaotic processing which generate Feistel type block ciphers, respectively. The embodiment corresponds to the case of FIG. 4A. Incidentally, FIG. 4B is of the DES system. While the embodiment adopts a flow of FIG. 4A, any of the flows of FIGS. 4A, 4B and 4C can be adopted in the present invention.

In the mean time, the mutual actions between a pair of odd- and even-numbered columns shown in FIG. 3 shows an extraction of only processing of adjacent two columns which mutually act therebetween and the overall processing performed in the data randomize section 11 shown in FIG. 2 is not a simple combination of the processings, one of which is shown in FIG. 3. Now, only a specific processing at the jth row is extracted and it will be described how chaining of processing in moving directions of a plain text 21 and a cipher text 25 go along the row direction based on FIG. 5.

Figure 5:
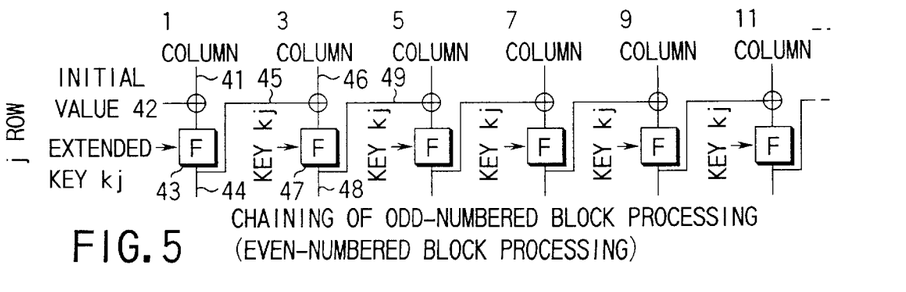
FIG. 5 is a diagram showing only the jth row (j is an odd integer) extracted from the encryption of FIG. 2.

FIG. 5 is a diagram showing only the jth row (j is an odd integer) extracted from the encryption of FIG. 2.

As shown in FIG. 5, processings of an odd-numbered column (odd-numbered block processing) are performed as a chaining. Incidentally, processing in an odd-numbered column is similar to the odd-numbered column processing.

At this point, after an input 41 of the 1st column and an initial value 42 are subjected to an exclusive OR, the result is transformed by a function F43 using an extended key Kj. A transformation result is output to an input 44 to the next row and an input 45 to transformation in the 3rd column (next odd-numbered block).

After an input 46 of the 3rd column and an output 45 of the 1st column are subjected to an exclusive OR, the result is transformed by a function 47 using an extended key Kj. A transformation result is output to an input 48 to the next row and an input 46 to transformation in the 5th column (next odd-numbered block).

Below, likewise, a chaining of a processing result in the preceding odd-numbered block is input to transformation in the next odd-numbered block is continued. In such a manner, flows of chaining processing are performed only within any group of odd-numbered column processings (odd-numbered block processings) and even-numbered column processings (odd-numbered block processings).

In the mean time, with the initial value 42 provided, processing of odd- and even-numbered columns can be absolutely regarded as that of the same circuit. For this reason, since the same circuit can repeatedly be operated, the number of circuits for odd-numbered block processing and the even-numbered block processing to be prepared in the data randomize section 11 can be small. Therefore, the initial value may be a dummy.

Now, the data randomize section 11 shown in FIG. 2 is constituted of a combination of processing circuits which exerts mutual actions between odd- and even-numbered columns and circuits which perform chaining processing only within any group of odd-numbered columns and even-numbered columns shown in FIG. 5.

Therefore, processing in the circuitry shown in FIG. 2 is described in the following way:

First, after the odd-numbered small block 23 in the 1st column and the initial value 51 are subjected to an operation, the result is transformed in the function F52 with the extended key K1. The trans-formation result 53 is used in an operation 54 with the odd-numbered small block 23 in the 3rd column, in an operation 55 with the even-numbered small block 24 in the second column and in an operation 56 in the 3rd row.

Herein, it will naturally be understood that the operations 55 and 56 constitute mutual action means for the 1st column and 2nd column to mutually action on each other and the operation 54 is chaining means for the 1st column and the 3rd column to mutually act on each other.

In such a manner, an output result of transformation at the i column and j row is used an operation with an input at the i+2th column and the j row in order to extend a chaining to the i+2th column. Further, in the case where i is an odd integer, an output result of the operation is subjected to an operation with an input at the i+1th column and the j+1 row, and further an operation between an output at the i+1th column and the j+1 row and an input at the ith column and the j+2th row in order to exert a mutual action between the i+1th column (when i is an even integer, the i−1th column) and the i column. In such a manner, the above-described mutual action and a chaining are secured.

As can be seen from FIG. 1, since the encryption can sequentially be performed for inputs and a cipher text as a processing result can sequentially be output immediately after the processing is completed, such processing is characterized by that inputs are not necessary to be temporarily stored in storage means and thereafter, all processing for the inputs is not also necessary to be collectively performed.

Decryption is performed in the order of processings reverse to that of encryption. That is, in FIG. 1, a flow of decryption processing goes from the bottom to the top.

Then, operations in chaining processing will be described.

In the embodiment, it is assumed that a block length of a small block 22 and the number of chaining can freely be set and for example, secure encryption can be realized even for a case of a block length as short as of the order of 1 byte. The reason why is that a similar effect of performing encryption for a really large block (called a segmented block) is obtained by a chaining action of small blocks 22. While a mutual action between adjacent two small blocks are described above using FIG. 3, the whole group in which odd-numbered small blocks are connected by chaining and the whole group in which even-numbered small blocks are connected by chaining perform a Feistel type mutual action. This point will be described later.

Since the number of chaining can freely be set by the block length designation section 16 shown in FIG. 1, encryption of an input with a variable length in which a length of an input block (a plain text 21) is changed is enabled by selecting the number of repetitions of processing on a chaining.

For example, it is only required that first, the number of bytes of each of plain texts, which are sequentially input to the encryption/decryption processor 2 from the plain text file 3, and which are different in length, is read in the block length designation section 16. Then, the number of chaining is obtained by dividing the number of bytes of each plain text by a block length set to, for example, 1 byte and the number of chaining of each plain text is input to the respective sections 11, 13, 14, 15 from the block length designation section 16.

Then, a mutual action between the whole group in which odd-numbered small blocks are connected by chaining and the whole group in which even-numbered small blocks are connected by chaining will be described.

Figure 6:
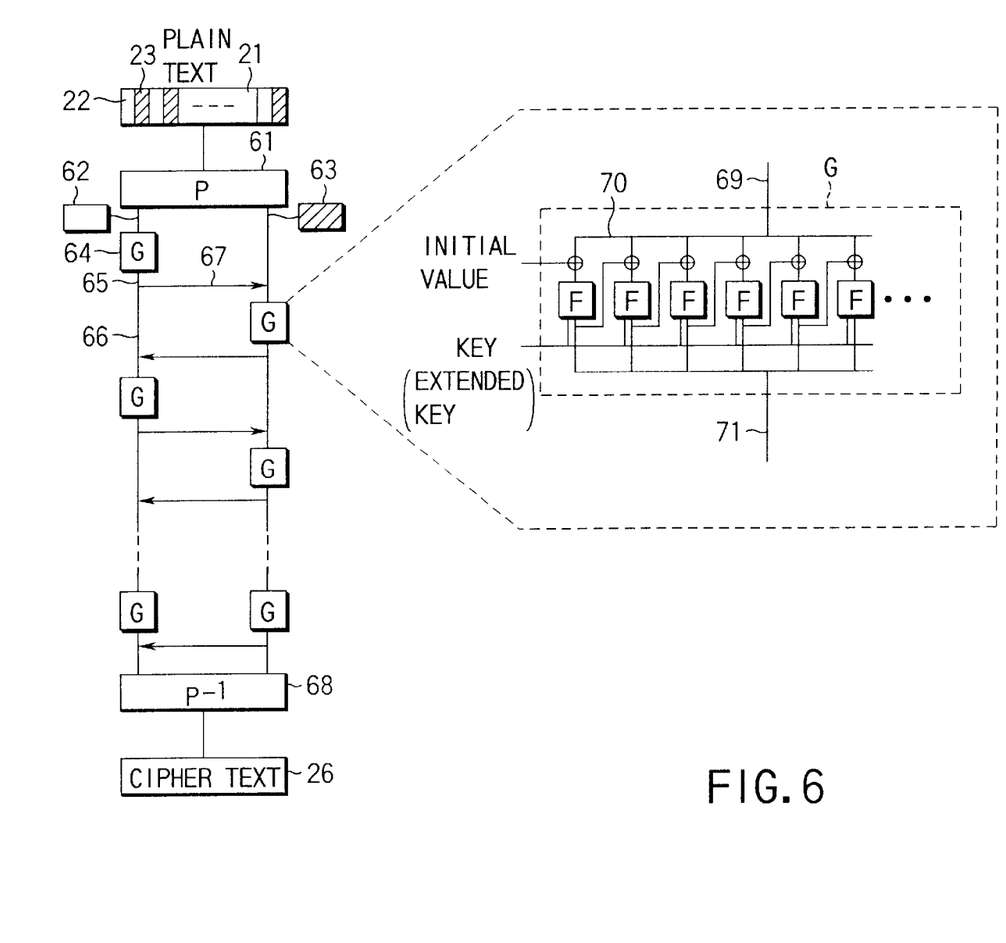
FIG. 6 is a block diagram showing an example equivalent to the encryption circuitry of FIG. 2.

FIG. 6 is a block diagram showing an example equivalent to the encryption circuitry of FIG. 2.

In this circuitry, a plain text 21 which is input by transformation P61 is rearranged as an odd-numbered part 62 in which only odd-numbered small blocks 22 are collected and an even-numbered part 63 in which only even-numbered blocks 23 are collected.

After the odd-numbered part 62 is transformed by a function G64, the transformation result 65 is transmitted to an input 66 to transformation at the next row and to an input 67 of processing of the even-numbered part 63.

Then, transformation is advanced while transformation results are alternately used for mutual actions between the columns and a cipher text 26 is obtained by conducting an inverse transformation $p^{-1}$ 68 which is an inversion of the transformation P61.

In the mean time, as shown in a partially enlarged diagram of FIG. 6, after a function G divides an input 69 into small blocks 70, the function G outputs a result 71 which has been subjected to transformation (includes a function F) in which chaining flows each similar to one of FIGS. 4A to 4C are included.

In such a manner, it is understood that processing in FIG. 6 is similar to that of FIG. 2 though both processing is apparently different. Further, a configuration shown in FIG. 6 is equivalent, in format, to a cipher which belongs to a format of a Feistel type block cipher (FIG. 4A) and discussion on security which applies to a Feistel type cipher can applies to FIG. 6, as it is.

Therefore, a configuration of a secure substitution table for a Feistel type cipher which Nyberg et al. has presented, that is, an encryption configuration by an APN substitution table can be adopted. In the encryption/decryption processor 2 of the embodiment, an encryption configuration by the APN substitution table is employed.

Then, descriptions will be made of the data processor in the embodiment which is constructed as described above.

In the processor, a plain text (segmented block) with an indefinite length is retrieved from the plain text file 3. Not only are a block length and the number of chaining determined by the block length designation sections 16 according to a length of the plain text, but the plain text is input to the small block segmentation/division section 14.

In the small block segmentation/division section 14, the plain text is sequentially segmented into small blocks and the small blocks are input to the data randomize section 11 while separating into two groups of odd-numbered small blocks and even-numbered small blocks. The plain text which has been input to the data randomize section 11 is sequentially processed in the order from a small block 22 at the leading position to a small block 23 at the tail end and the small blocks 22 receive to chaining and mutual actions. The encryption at this point is conducted such that processing from the 1st column through the final column and processing from the 1st row to the mth row of FIG. 2 are performed sequentially, respectively and encryption results are also sequentially output from the 1st column to the final column one small block 26 as a unit at a time.

The small blocks 26 which has been encrypted are edited by the small block segmentation/division section 15 and thereafter, stored in the cipher text file 4 as a cipher text.

Incidentally, in the case of decryption, processings are performed in the order reverse to in the case of encryption.

As described above, since in the data processor according to the embodiment of the present invention, in its encryption algorithm, not only is an encryption object segmented into small blocks, but small blocks are selectively connected by chaining between odd-numbered columns and by chaining between even-numbered columns, secure encryption can be realized even when a size of small blocks is small.

Further, when a length of small blocks and the number of chaining are adjusted and thereby processing of variable-length blocks is enabled, secure encryption can efficiently be realized even if a plain text has a different length and comparatively short length.

Besides, since sequential processing can be performed in the data randomize section 11, there is no need to store intermediary processing results in a buffer and processing results can sequentially be output immediately after the processing is completed.

Further, since sequential processings are performed, overall efficiency is not decreased even when a block length input to the encryption processor 2 is longer. Therefore, even when a short key is employed, if, for example, the number of chaining is increased and a virtual block length is long, security against a round-robin attack can be increased.

In the mean time, in the embodiment, while the key transformation section 12 generates extended keys K by a secret key cryptosystem and the extended keys are supplied to the respective rows of the data randomize section 11, the present invention is not limited to such a key provision system, but, for example, the same key may be supplied to all the row in the key transformation section 11, or keys, which have different histories, and which is different from extended keys can respectively be supplied to all the rows. Besides, different keys may respectively be supplied not only to the rows, but to the columns.

Further, in the data randomize section 11 of the embodiment, for example, when the number of columns is large, the number of rows where processing by a function F as transformation means is performed may be decreased. With a decreased number of rows, since an encryption result of the final column by sequential processing can quickly be output, efficiency in encryption/decryption can be improved. Further, since a sufficient chaining action is exerted in the part where the number of columns is large, it is conceivable that high security level can be obtained even if the number of row is small.

In the mean time, as a changing method for the number of rows, there are named a method in which the number of rows is decreased when the number of columns exceeds a prescribed value, a method in which as the number of columns is increased, the number of rows is decreased in a corresponding manner and the like.

Second Embodiment of the Present Invention

The embodiment is same as the data processor of the first embodiment with the exception that a direction of a chaining is switched depending on the row number.

The data processor of the embodiment is same as the data processor of the first embodiment with the exception that a direction of a chaining in the data randomize section 11 corresponding to FIG. 2 is switched to the backward direction at a designated row number.

Figure 7:
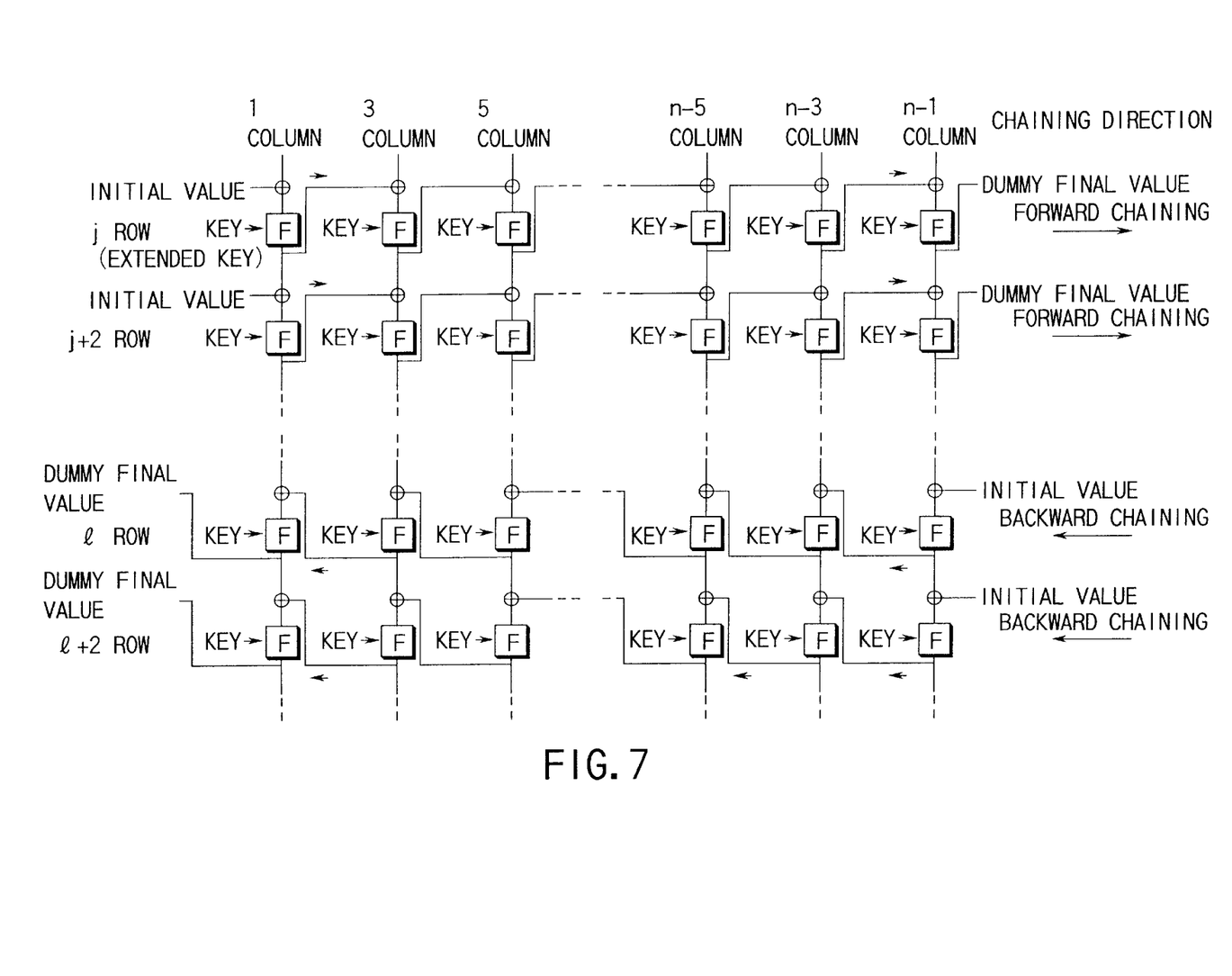
FIG. 7 is a block diagram showing an example of part of a configuration of a data randomize section in the data processor according to a second embodiment of the present invention.

FIG. 7 is a block diagram showing an example of part of a configuration of the data randomize section in the data processor according to the second embodiment of the present invention.

The figure is an extracted diagram of only a configuration for processing in which chaining relations at the jth row, j+2th row, lth row and l+1th row are included.

The chaining from the 1st row to the l–2th row including the j+2th row are similar to the first embodiment, wherein chaining of odd-numbered small blocks are formed from the 1st column to the n–1th column in a forward direction. Incidentally, in the embodiment, the final column is the nth column and accordingly, the number of chaining is n/2.

On the other hand, among the entire chaining from the 1st row to the final row, chaining from the n–1th column to the 1st column are directed in the backward direction.

In the mean time, even-numbered columns are constructed similar to odd-numbered columns and a chaining direction is switched at the l+1th column.

Further, the row number at which a chaining direction is switched can be designated from the block length designation section, in a freely changeable manner, independently for odd-numbered columns and even-numbered columns. In a normal encryption state, odd-and even-numbered columns are designated so as to switch chaining directions in almost the same timing as in the above-described case.

As described above, since the data processor according to the embodiment of the present invention is provided with a configuration similar to the first embodiment and in addition switching of a chaining direction can be conducted at a prescribed row, effects similar to those to the first embodiment are obtained and besides, all inputs exert influences thereof on encryption results, which enables a cipher with high security which is harder to be deciphered.

Further, since it can be a secret of a cipher user along which directions and at which row chaining are connected, communication guarded with higher security can be realized.

Third Embodiment of the Present Invention

The embodiment is a case where a plurality of transformation means which have no dependence relationship on one another with respect to inputs are processed in parallel to one another in the first or second embodiment.

A data processor of the embodiment is constructed same as the first or second embodiment with the exception of such parallel processing performed therein.

Figure 8:
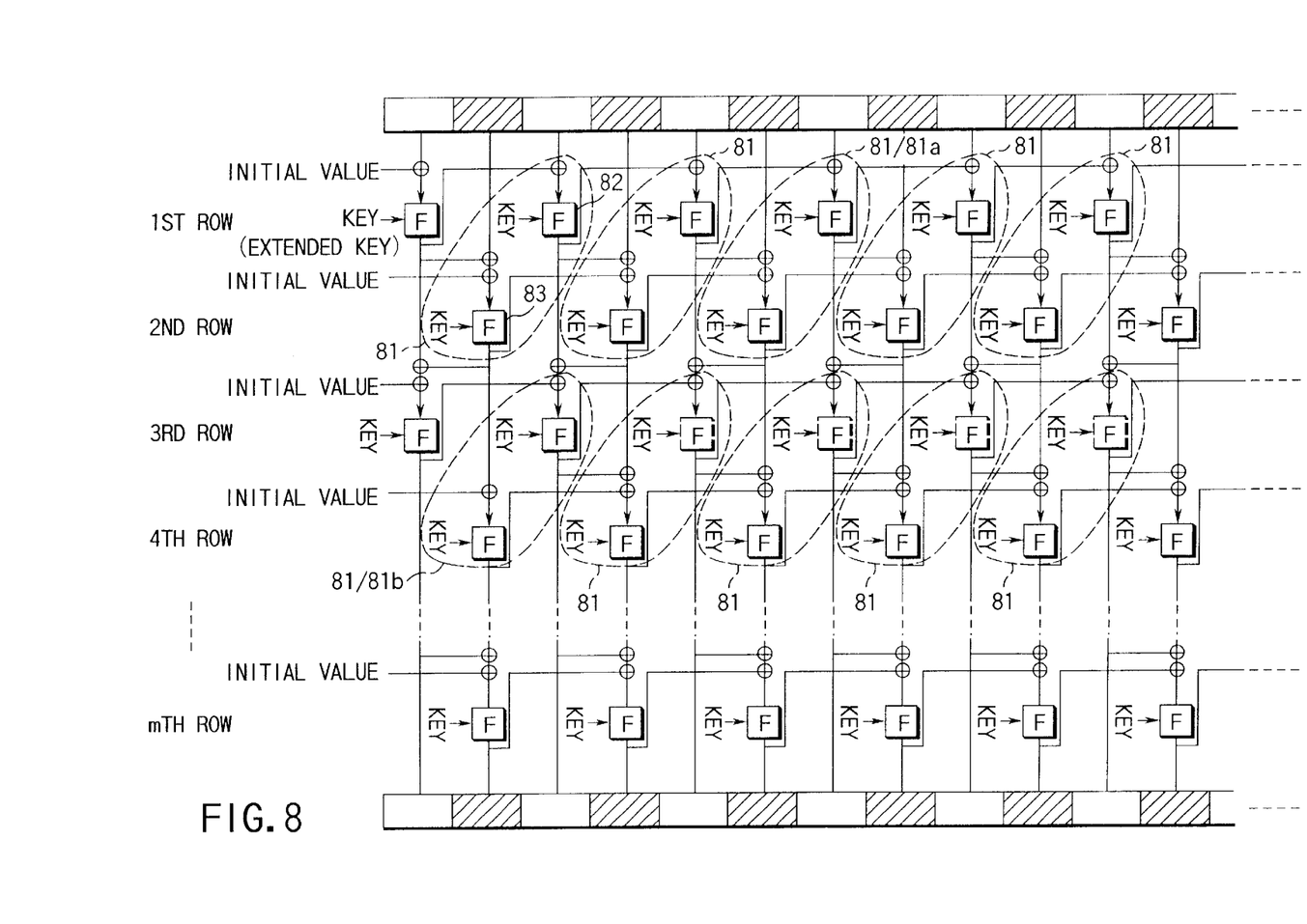
FIG. 8 is a block diagram showing parallel processing parts in a data processor according to a third embodiment of the present invention.

FIG. 8 is a block diagram showing parallel processing parts in the data processor according to the third embodiment of the present invention.

In the figure, since no dependence relationship is between two functions F82 and F83 which are included with circles 81 drawn in a broken line with respect to input/output, parallel processing can be conducted on them and parallel processing is performed on the functions by some means not shown.

Further, since no dependence relationship is between processings in circles 81*a* and 81*b* of two circles 81 with respect to input/output, parallel processing can be conducted therebetween and parallel processing is performed on the circles 81*a* and 81*b* as described above.

As described above, since in the data processor according to the embodiment of the present invention, a configuration same as the first or second embodiment is provided and besides parallel processing is performed where there is no dependence relationship with respect to input/output, not only can effects similar to those of the first or second embodiment obtained, but overall processing speed can be increased and thereby processing efficiency can be increased.

Fourth Embodiment of the Present Invention

The embodiment is a communication system in which a data processor as an encryption/decryption processor in the first to third embodiments is one communication party and another encryption/decryption processor in the embodiments is the other communication party and description will be made of the communication system.

Figure 9:
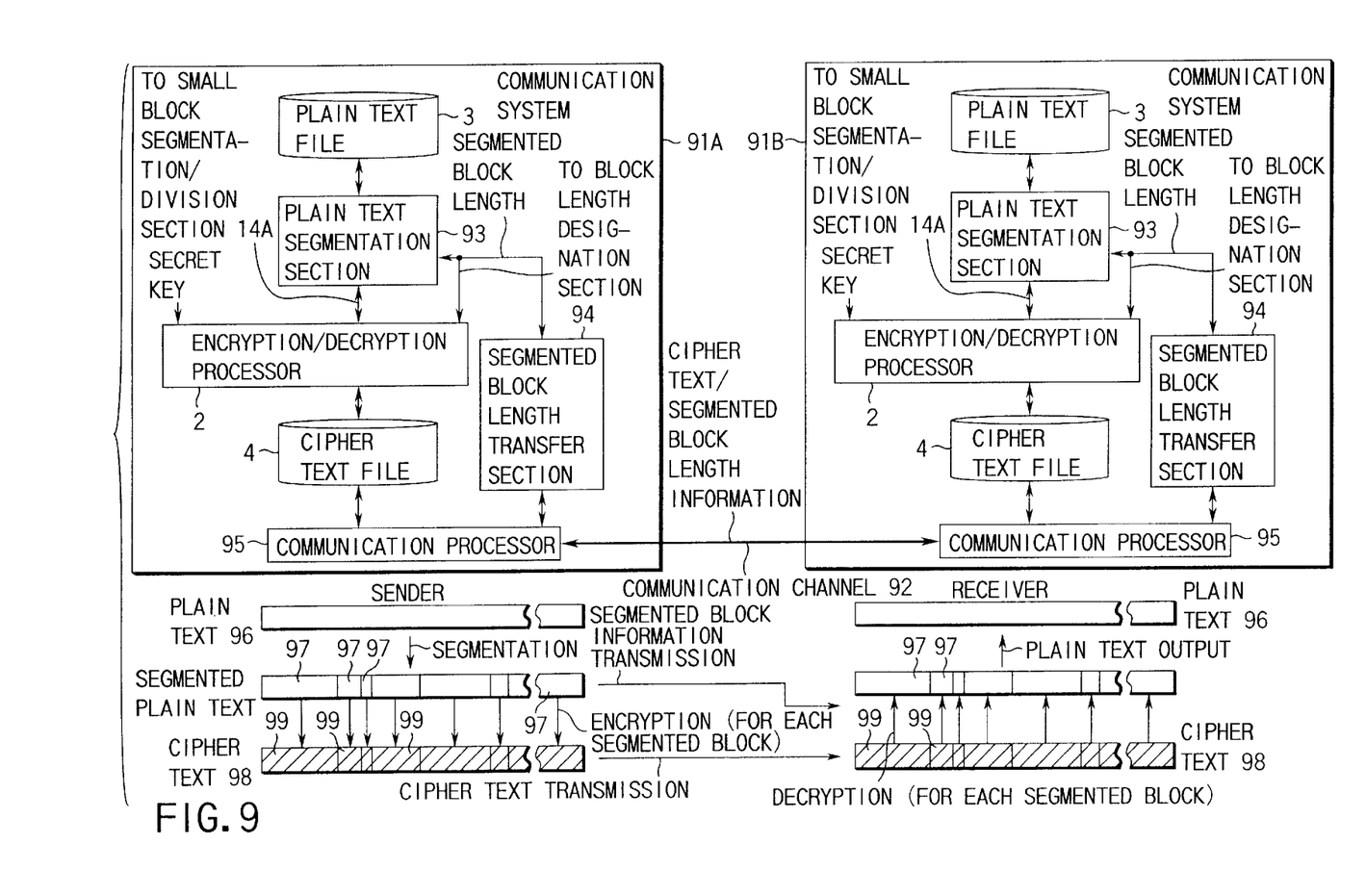
FIG. 9 is a block diagram showing an example of a configuration of a communication system according to a fourth embodiment of the present invention.

FIG. 9 is a block diagram showing an example of configuration of the communication system according to the fourth embodiment of the present invention. The same constituents as those of FIGS. 1 to 8 are indicated by the same reference marks and descriptions are given except the same constituents.

The communication system is a system in which communication systems 91A and 91B are connected by way of a communication channel 92 and as the communication channel, various kinds such as LAN and internet are named.

The communication systems 91A and 91B have the same configuration and one is operated as a sender but the other is operated as a receiver. That is, a communication systems 91A or 91B comprises: an encryption/decryption device 1; a plain text division section 93; a segmented block length transfer section 94; and a communication processor 95.

The plain text division section 93 segments a plain text to be transmitted into blocks with a various length, inputs the plain text to the small block segmentation/division section 14 in the encryption/decryption processor 2 one segmented block as a unit at a time and further transfers lengths of the blocks to a block length designation section 16 and a segmented block length transfer section 94 in order to encrypt each block of the plain text as a unit. Incidentally, a block obtained by segmenting a plain text is hereinafter referred to as a segmented block in order to differentiate the block from a small block and a block length and a block length of the segmented block is hereinafter referred to as segmented block length or a length of a segmented block. Incidentally, a product of a block length and the number of chaining is a segmented block length.

The segmented block length transfer section 94 transfers information on segmented block lengths, for example, after encryption of the information to the communication system 91B from the communication system 91A or vice versa in a secret way. Further, a key which is used in the encryption/decryption processors 2 of the communication systems 91A and 91B can be shared between the systems 91A and 91B.

Then, description will be made of the communication system in the embodiment which is constructed as described above.

First, in the communication systems 91A on the sender side, a plain text 96 which is desired to be sent by encryption communication is segmented into segmented blocks with lengths which are not necessarily equal to each other in the plain text segmentation section 93 and each of the segmented blocks is encrypted in the encryption/decryption processor 2 which can processes variable-length blocks using a secret key. A length of a small block and the number of chaining which are used for encryption are calculated in the block length designation section 16 based on segmented block lengths. Incidentally, in the embodiment, a block length of a small block is a fixed 1 byte.

A cipher text 98 thus prepared is transmitted through the communication channel 92. While it is necessary that a sender and receiver in the encryption communication meet and determine how a plain text is segmented in advance, the way of segmentation is transferred to the receiver before start of the transmission as segmented block length information through processing between the segmented block length transfer sections 94.

Then, in the communication system 91B on the receiver side, received segmented block information and a cipher text 98 are decrypted every segmented block 99. At this point, the number of chaining of each segmented block 99 which has been encrypted is calculated based on the segmented block length.

After the decryption, the segmented blocks 97 are connected to one another to restore a plain text 96 same as the original text.

As described above, the communication system according to the embodiment of the present invention prepares the cipher texts 98 each with an indefinite length and performs encryption communication between the communication systems each comprise: the encryption/decryption processor 2; the plain text segmentation section 93 and the segmented block length transfer section 94, which are those of any of the first to third embodiments and further, conducts transfer and reception of the segmented block lengths between the communication systems as secret information. Therefore, not only can effects similar to those of the first to third embodiments be obtained, but encryption communication with higher security can be realized, while a block length and a chaining direction are given as variable parameters and those are kept secret between the sender and receiver in the encryption communication.

The above encryption communication is so similar to an ordinary encryption communication, but deciphering is almost impossible since a block length of a segmented block which is subjected to encryption is variable and therefore, a boundary between segmented blocks are not found by a mala third party, who tries to listen illegally to transmission in the communication channel 92.

Fifth embodiment of the present invention

The embodiment is an improvement of a segmentation method of a plain text to obtain segmented blocks in a plain segmentation section in the fourth embodiment.

Figure 10:
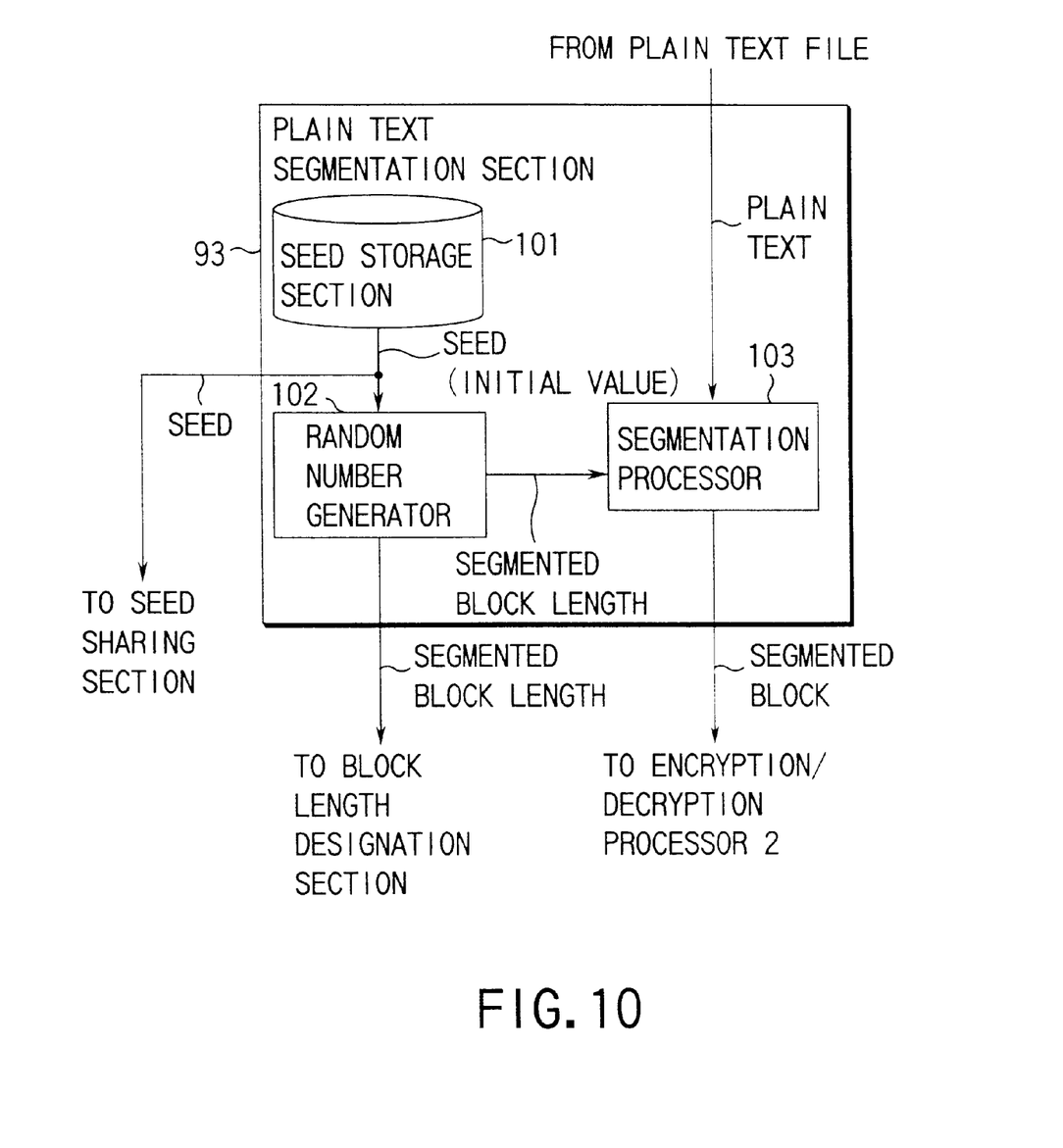
FIG. 10 is a block diagram showing an example of a configuration of a plain text division section in the communication system according to a fifth embodiment of the present invention.

FIG. 10 is a block diagram showing an example of a configuration of the plain text segmentation section in the communication system according to the fifth embodiment of the present invention. The same constituents as those of FIG. 9 are indicated by the same reference marks and descriptions are given to constituents of the embodiment except the same constituents.

The communication system of the embodiment are constructed similar to the fourth embodiment with the exception that configurations of the plain text sections 93 in the communication systems 91A and 91B are modified.

A plain text segmentation section 93 comprises a seed storage section 101, a random number generator 102, and a segmentation processor 103.

The seed storage section 101 stores a seed.

The random number generator 102 generates random numbers based on a seed retrieved from the seed storage section 101 and outputs the random numbers as segmented block lengths to the block length designation section 16 and the segmentation processor 103 of the encryption/decryption processor 2.

The segmentation processor 103 segments a plain text using segmented block lengths obtained from the random number generator 102 and outputs segmented blocks to the small block segmentation/division section 14.

Then, description will be made of operations of the data processor in the embodiment which is constructed as described above.

First, a seed is a base for calculation of segmented block lengths and notified to the other communication party by a seed sharing means not shown. The seed sharing means may be an encryption communication means like the segmented block length transfer section 94 of FIG. 9, a direct transfer by a recording medium without intermediate cooperation of the communication channel 92 or the like. Accordingly, in the embodiment, there is no need to directly transfer or receive a segmented block length between the communication systems.

Then, random numbers are outputs by the random number generator 102 with a seed owned by a sender as an initial value. The generated random numbers are further transformed to numerical values which can be used as segmented block lengths by the same random number generator 102 for outputting.

The plain text is sequentially segmented into segmented blocks with segmented block lengths which are generated by the random number generator 102 and then input to the encryption/decryption processor 2. On the other hand, the segmented block lengths themselves are input to the encryption/decryption processor 2 and used for calculation of the number of chaining.

The following operations are similar to the fourth embodiment.

As described above, while the communication system of the embodiment of the present invention has a configuration similar to the fourth embodiment, the communication system calculates segmented block lengths based on random numbers generated from a seed. Hence, not only can effects similar to those of the fourth embodiment be obtained, but a variable length of a segmented block is determined with a random number and thereby, boundaries between segmented blocks in a cipher text are harder to be found.

Therefore, even when the communication channel 92 is illegally eavesdropped by the third party and a cipher text is secretly stolen by the same, the third party cannot find boundaries between segmented blocks, which makes it impossible to read the cipher text.

In the mean time, the operational procedures described in the embodiments can be distributed in the form of a recording medium such as a magnetic disk (floppy disk, hard disk etc.), an optical disk (CD-ROM, DVD etc.) and a semiconductor memory in which the operational procedure is stored as programs (software mean) on which a computer run, or alternatively transmitted through a communication medium as the programs. In the mean time, the programs which is stored on the recording medium side include a setting program which enables software mean which is run by a computer (the means includes not only an execution program, but a table and a data structure etc.) to be established in the computer architecture. A computer which realizes a communication system reads programs stored in recording medium, forms software means according to the setting program depending on circumstances and activates and runs the constituents in the communication system through the software means so as to execute the above described processing.

According to the present invention, as detailed above, since all the blocks which are objects to be encrypted are further segmented into small blocks and the small blocks are processed to encrypt while having chaining and mutual actions of processing, even when a block length in block encryption is short, transmission efficiency can be increased while preventing reduction in a degree of security caused by shortness of a block length from occurring. Besides, there can be provided a data processor, a communication system and a recording medium whereby a Feistel type cryptosystem can be realized.

Further, according to the present invention, there can be provided a data processor, a communication system and a recording medium in which a segmented block length itself which is an object for encryption can be made variable by making the number of chaining and a length of a small block variable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processor comprising:
a transformation section in which small blocks which are obtained by sequentially segmenting at least one of a plain text and a cipher text from a leading edge thereof are transformed with keys;
a mutual action section in which the small blocks transformed in the transformation section and other small blocks are chained with each other; and
a chaining section in which the small blocks transformed in the transformation section are chained with other small blocks not adjacent to the small blocks transformed in the transformation section.

2. A data processor according to claim 1,
wherein, of the small blocks obtained by segmenting at least one of the plain text and the cipher text, odd-numbered small blocks counted from a leading edge of the small blocks obtained by segmenting at least one of the plain text and the cipher text and small blocks following the odd-number small blocks are named as odd-numbered small column blocks, even-numbered small blocks counted from the leading edge of the small blocks obtained by segmenting at least one of the plain text and the cipher text and small blocks following the even-number small blocks are named as even-numbered small column blocks,
the mutual action section causes the odd-numbered small column blocks to chain with the even-numbered column blocks and the chaining section causes the odd-numbered small column blocks to chain with each other and causes the even-numbered small column blocks to chain with each other.

3. A data processor according to claim 2,
wherein a chaining direction in the chaining section is a forward direction of columns; and
each of odd-numbered columns and even-numbered columns has the transformation section at a single row or more.

4. A data processor according to claim 3,
wherein the number of rows at which transformation sections are located, the transformation sections being included in the odd-numbered column and the even-numbered column, is decreased with increase in the number of the odd-numbered columns and the even-numbered columns.

5. A data processor according to claim 3,
wherein the chaining direction of the chaining section is switched from a forward direction of columns to a backward direction thereof when the number of rows at which the transformation sections are located reaches a prescribed number.

6. A data processor according to claim 3,
wherein processing in the transformation sections other than transformation sections where a dependence relationship arises due to processing in the mutual action section and processing in the chaining section is performed in parallel.

7. A data processor according to claim 2,
wherein at least one of a length of the small blocks and the number of chaining of the small blocks is variable.

8. A communication system comprising:
a first communication system for transmitting a cipher text by using the data processor according to claim 2; and
a second communication system for decrypting the cipher text transmitted from the first communication system to a plain text by using the data processor according to claim 2,
wherein a block length of the which is determined by a length of the small block and the number of chaining of small blocks is shared between the first and second communication systems.

9. A communication system according to claim 8,
wherein the block length is variable in each of the small blocks.

10. A communication system according to claim 9, further comprising:
a random number generator for determining the block length based on a seed which is shared by the first and second communication systems.

11. A communication system according to claim 8,
wherein a timing in which a direction of a chaining is switched is shared by the first and second communication systems.

12. A computer program product for operating a computer, the program computer program product comprising:
a computer readable medium;
first program instruction means for instructing a computer processor to transform small blocks with keys, the small blocks being obtained by sequentially segmenting at least one of a plain text and a cipher text from a leading edge of the at least one of the plain text and the cipher text;
second program instruction means for instructing the computer processor to cause the transformed small blocks and other small blocks to chain with each other; and
third program instruction means for instructing the computer processor to cause the transformed small blocks to chain with other small blocks not adjacent to the small blocks transformed,
wherein each of the program instruction means is recorded on the medium in executable form and is loadable into the computer for execution by the processor.

13. A computer program product for operating a computer according to claim 12,
wherein, of the small blocks obtained by segmenting at least one of the plain text and the cipher text, odd-numbered small blocks counted from a leading edge of the small blocks obtained by segmenting at least one of the plain text and the cipher text and small blocks following the odd-number small blocks are named as odd-numbered small column blocks and even-numbered small blocks counted from a leading edge of the small blocks obtained by segmenting at least one of the plain text and the cipher text and small blocks following the even-number small blocks are named as even-numbered small column blocks,
the second program instruction means causes the odd-numbered small column blocks and the even-numbered small column blocks to chain with each other, and
the third program instruction means causes the odd-numbered small column blocks to chain with each other and causes the even-numbered small column blocks to chain with each other.

14. A computer program product for operating a computer according to claim 13,
wherein a chaining direction is a forward direction of columns,
the first instruction means is provided at one or more rows of each of odd-numbered rows and even-numbered rows, and
at least one of a length of the small blocks and the number of chaining of the small blocks is variable.

* * * * *